(12) United States Patent
Blitstein

(10) Patent No.: US 6,822,788 B2
(45) Date of Patent: Nov. 23, 2004

(54) WAVELENGTH SPECIFIC COATING FOR MIRRORED OPTICS AND METHOD FOR REDUCING REFLECTION OF WHITE LIGHT

(75) Inventor: Jeffrey L. Blitstein, Folsom, CA (US)

(73) Assignee: Honeywell International Inc., Morristown, NY (US)

( * ) Notice: Subject to any disclaimer, the term of this patent is extended or adjusted under 35 U.S.C. 154(b) by 0 days.

(21) Appl. No.: 10/453,446

(22) Filed: Jun. 2, 2003

(65) Prior Publication Data

US 2004/0008406 A1 Jan. 15, 2004

Related U.S. Application Data

(63) Continuation of application No. 09/812,064, filed on Mar. 16, 2001, now abandoned.
(60) Provisional application No. 60/244,045, filed on Oct. 27, 2000.

(51) Int. Cl.[7] .................................. G02B 5/08
(52) U.S. Cl. .................. 359/350; 359/351; 359/885; 252/987; 250/338.1; 250/330
(58) Field of Search ................... 359/356, 350, 359/885, 361, 351; 252/587; 250/338.1, 330, 332, 353; 428/334; 427/577

(56) References Cited

U.S. PATENT DOCUMENTS

| 4,098,956 A | 7/1978 | Blickensderfer et al. |
|---|---|---|
| 4,383,728 A | 5/1983 | Litington |
| 4,504,519 A | 3/1985 | Zelez |
| 4,504,553 A | 3/1985 | Aubert et al. |
| 4,603,082 A | 7/1986 | Zelez |
| 4,728,529 A | 3/1988 | Etzkorn et al. |
| 4,746,798 A | 5/1988 | Amon et al. |
| 4,822,359 A | 4/1989 | Tano et al. |
| 5,101,415 A | 3/1992 | Kolb et al. |
| 5,552,272 A | 9/1996 | Bogart |
| 5,608,220 A | 3/1997 | Wieser et al. |
| 5,643,641 A | 7/1997 | Turchan et al. |
| 5,939,201 A | 8/1999 | Boire et al. |

FOREIGN PATENT DOCUMENTS

| DE | 203 903 A | 11/1983 |
|---|---|---|
| GB | 1 569 809 | 6/1980 |

*Primary Examiner*—Fayez Assaf
(74) *Attorney, Agent, or Firm*—John P. O'Banion

(57) ABSTRACT

An amorphous diamond coating applied onto mirrored optics in an infrared motion sensor to block specific wavelengths of energy from a "white light" source like a halogen lamp, without reducing the reflectivity of the mirror surface in the Mid-Infrared wavelengths. A specific thickness of diamond-like-coating is applied on top of the reflective metal surface of a mirrored part, thereby reducing the mirror's reflectivity at visible and near-Infrared wavelengths known to be problematic for IR motion sensors, such as those emitted from halogen lamps. The coating has no significant detrimental effect on mid-Infrared reflectivity, so the IR motion sensor's performance is otherwise unaffected.

16 Claims, 3 Drawing Sheets

US 6,822,788 B2

WAVELENGTH SPECIFIC COATING FOR MIRRORED OPTICS AND METHOD FOR REDUCING REFLECTION OF WHITE LIGHT

CROSS-REFERENCE TO RELATED APPLICATIONS

This application is a continuation of U.S. application Ser. No. 09/812,064 filed on Mar. 16, 2001, now abandoned which claims priority from U.S. provisional application serial No. 60/244,045 filed on Oct. 27, 2000.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Infrared motion sensors such as those used for detecting human targets are typically subjected to various sources of radiation during their operation. Furthermore, motion sensors using mirrored optics are generally unprotected from various undesired wavelengths of incoming radiation. As a result, most of the energy that reaches the mirror surface is reflected and focused onto the infrared detector. This causes false alarms and/or other inaccurate detection events.

Sunlight, as well as well as tungsten/halogen lamp sources such as automobile headlamps, produce one type of electromagnetic radiation that is known to promote false alarms in infrared motion sensors. These radiation sources emit radiation in both the visible (e.g., 360 nm to 760 nm) and the infrared (e.g., 760 nm to 50 $\mu$m) spectrum. Accordingly, compliance testing of infrared motion sensors in various countries often involves the use of a halogen light source at fairly intense levels (e.g., 2000 to 6000 lux) to determine the immunity of the motion sensor to this type of radiation.

It has been the attempt of many manufacturers of motion sensors to develop improved ways to make the infrared sensing elements less susceptible to the effects of these types of light sources. For example, some sensors use a protective absorbing layer beneath the reflective layer of the mirror (see, for example, U.S. Pat. No. 5,608,220 to Wieser et al., incorporated herein by reference) to remove potentially harmful radiation from the detector path. However, there is still a need for a more effective manner in which to inhibit visible and near infrared light (sometimes referred to as "white light" in the motion sensor industry) to protect the sensing element(s).

BRIEF SUMMARY OF THE INVENTION

By way of example, and not of limitation the invention comprises a method of reducing the incidence of visible and near-infrared light impinging on a reflective surface of an optical reflector by overlaying said reflective surface with a layer of non-crystalline carbon material. The invention also comprises a mirror having a substrate base, a layer of reflective material adjacent to the substrate base, and a light absorbing layer adjacent to the layer of reflective material. In the preferred embodiment of the invention, a diamond-like-coating (DLC) protective layer is placed on top of a reflective (e.g., metallized) mirror surface. This amorphous diamond coating has been developed for this application by Diamonex Performance Products, Allentown, Pa. and is referred to by Diamonex as "DLC-B".

An object of the invention is to coat the surface of a mirror with a protective layer that absorbs broad-band visible and near-infrared radiation so that said radiation is reduced before it reaches the infrared (IR) sensor.

Another object of the invention is to coat the surface of a mirror with a material that acts as a protective over-coating to prevent damage to the mirror surface due to abrasions, oxidation, corrosion, or atmospheric contamination.

Another object of the invention is to coat the surface of a mirror with a material that can be "tuned" to selectively block a specific wavelength of IR and/or visible energy (to below 10% of incident radiation) which are determined to be most adverse to the performance of the infrared sensor.

Another object of the invention is to coat the surface of a mirror with a material that functions as an optical "notch" filter, with excellent suppression of selectable wavelengths, while otherwise being a reasonably good reducer of broad-band visible and near-infrared (NIR) radiation.

In addition, the coating has been shown to have little impact in the mid-infrared portion of the spectrum, where typical infrared motion sensors operate. In contrast, other alternative solutions, such as silicon-based windows or filters, will still reduce the amount of available mid-infrared energy by more than 20%. The present invention, however, deters MIR radiation by 5% or less.

Applications of this technology include, but are not limited to, lighting controls, motion sensors for security and lighting and other controls, temperature sensors and thermal controls, and thermal imaging.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
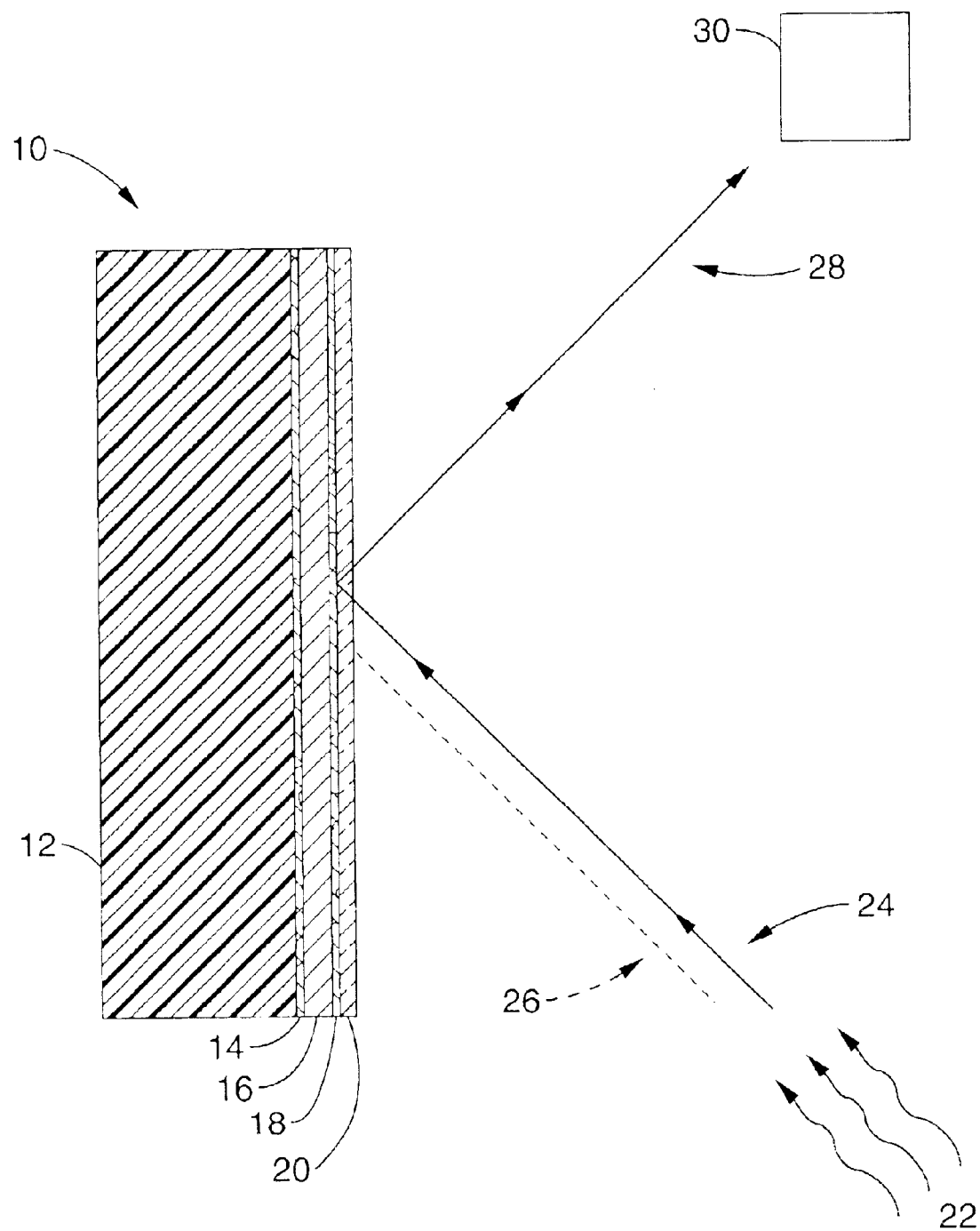
FIG. 1 is schematic view of an embodiment of a mirror employing a diamond-like light absorbing coating according to the invention.

Referring to FIG. 1, an embodiment of mirror employing a diamond-like-coating according to the present invention is shown. As shown, the mirror 10 comprises a substrate base 12, a first binding layer 14 overlaying the base 12, a metallized reflective coating 16 overlaying the first binding layer 14, a second binding layer 18 overlaying the reflective coating 16, and an absorbing layer 20 overlaying the second binding layer 18.

Substrate base 12 is preferably a machined or molded material which can be electro-plated or coated. The preferred material is acrylonitrile-butadiene-styrene (ABS) plastic, but other materials can be used as well. Examples of other suitable materials for use as the substrate base include polyvinyl chloride, acetal (Delrin®), nylon, polypropylene, polystyrene, polymethyl-methacrylate (PMMA, or "acrylic" plastic), polycarbonate plastic, glass, or aluminum. The thickness of substrate base 12 can be any desired thickness.

With regard to binding layers 14, 18, silicon is preferred for its adhesion characteristics. Binding layer 14 is preferably approximately 25 angstroms thick, and binding layer 18 is preferably approximately 175 angstroms thick.

Metallized layer 16 comprises the reflective mirror surface for infrared (IR) radiation, and can be made of any metallic substance which can be electroplated or vacuum deposited and which has the desired reflective properties. Chrome, having a thickness of approximately 1700 angstroms, is particularly well suited for this application. However, other materials can be used, such as aluminum, nickel or titanium. Alternatively, metallized layer 16 could be any IR reflecting substrate without a coating, such as Mo, Cr, Al, Ag, or Ti.

Absorbing layer 20 is preferably a diamond-like-coating (DLC) made of amorphous (non-crystalline) diamond (carbon) applied by means of vacuum deposition. Examples of suitable methods for producing diamond-like coatings are described in U.S. Pat. Nos. 4,728,329 and 5,643,641, both of which are incorporated herein by reference. This material is available from Diamonex Performance Products, Allentown, Pa. under the designation "DLC-B". Preferably, absorbing layer 20 has a thickness of approximately 1000 angstroms, although experimental results indicate that thicknesses can range from approximately 600 angstroms to approximately 1000 angstroms. Other thicknesses may be suitable as well; however, decreasing the coating thickness changes the absorption spectra of the coating towards shorter wavelengths. Further, while DLC-B is the preferred coating material, other materials that can be used include Diamonex NILAD (non-interlayer amorphous diamond), or Diamonex "DLC-A".

It will be appreciated that radiation 22 passing through the widow of the motion sensor has a mid-infrared radiation component 24 and a visible and near-infrared radiation component 26. Accordingly, the advantage of using absorbing layer 20 on a mirror in a motion sensor is that the visible and near-infrared radiation component 26 will be absorbed by absorbing layer 20. On the other hand, the mid-infrared radiation component 24 will be reflected by the metallized reflective coating 16 and directed as a beam 28 onto the infrared detector 30.

Figure 2:
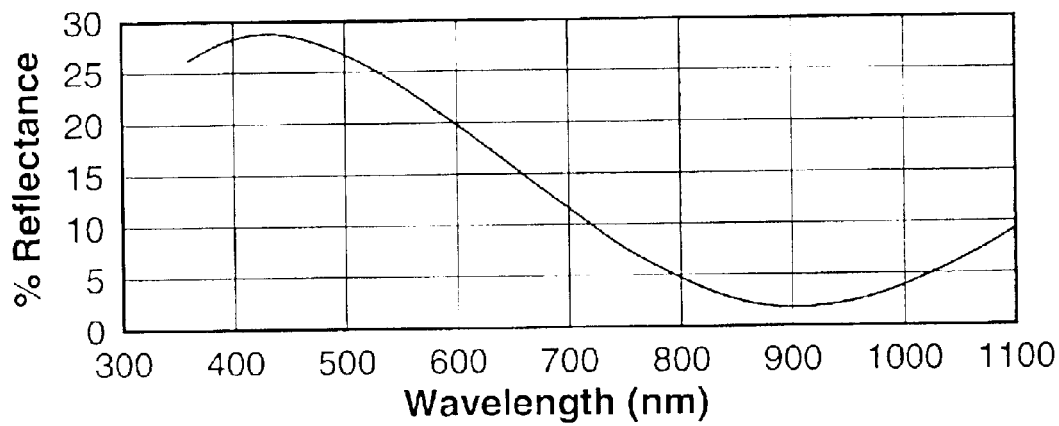
FIG. 2 is a graph showing the near-infrared blocking bandwidth of a DLC-chrome coating according to the present invention.
Figure 3:
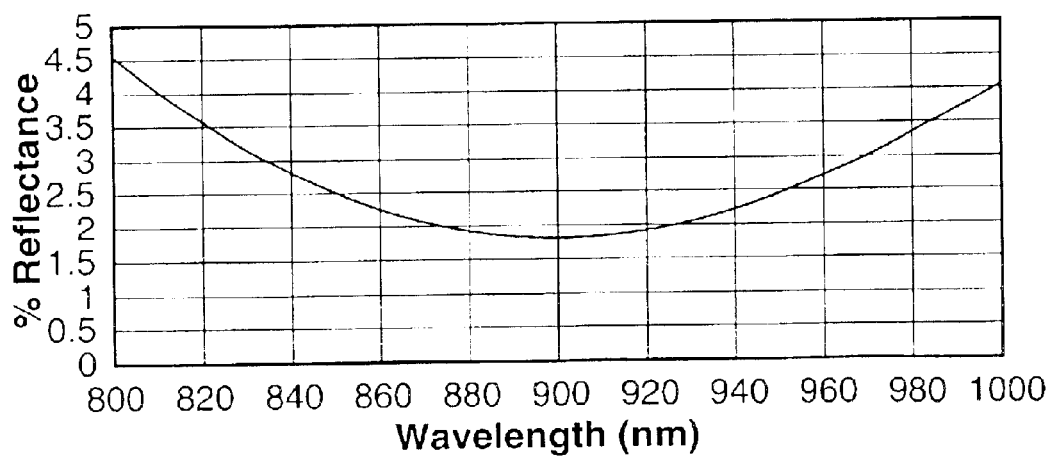
FIG. 3 is a detailed view of a portion of the graph show in FIG. 2.
Figure 4:
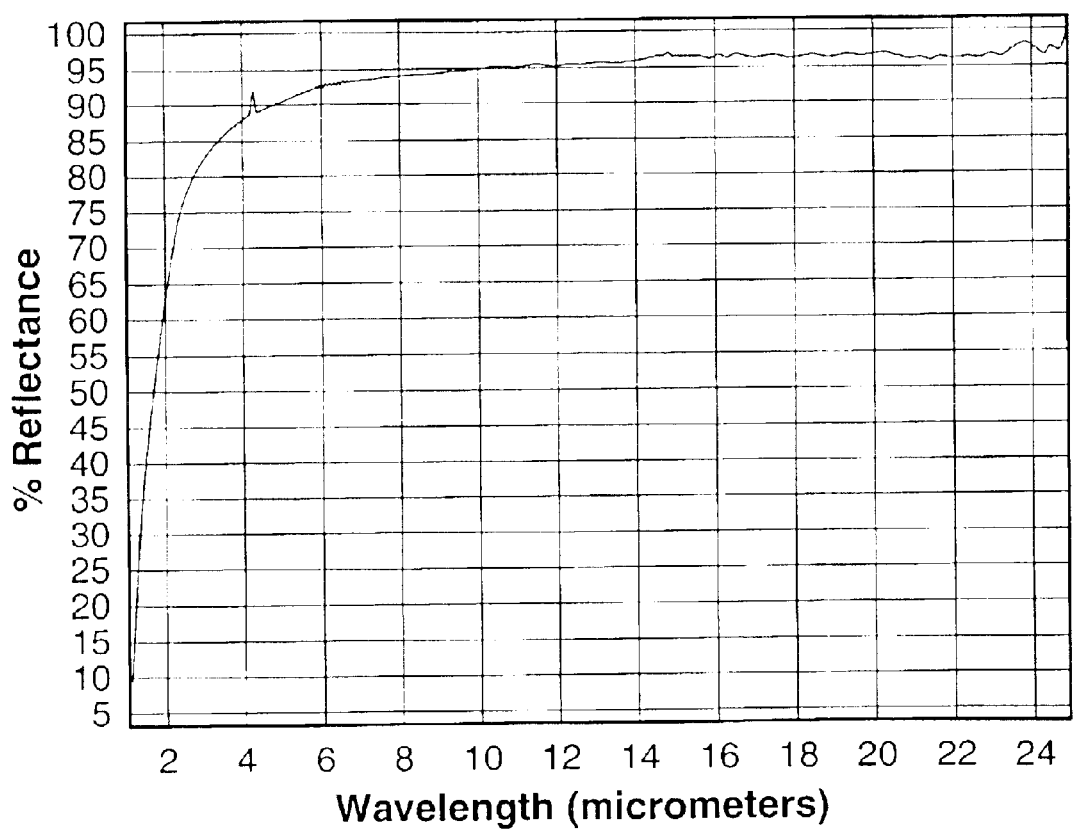
FIG. 4 is a graph showing the mid-infrared reflectance of a DLC-B coating over a chrome mirror in accordance with the present invention.

FIG. 2 and FIG. 3 are graphs showing the near-infrared blocking bandwidth of a DLC-chrome coating according to the present invention, and FIG. 4 is a graph showing the mid-infrared reflectance of a DLC-chrome coating according to the present invention. In FIG. 2, the results of a visible-near infrared reflectance scan for DLC over chrome on an ABS witness plate show an average reflectance of 13.1% over the range of 360 nm to 1100 nm. In FIG. 3, which is a detailed view of a portion of the graph in FIG. 2, the results show an average reflectance of 2.67% over the range of 800 nm to 1000 nm and a minimum reflectance of 1.81% at 900 nm. In FIG. 4, the results for a DLC-B sample over chrome on an ABS witness plate show that mid-infrared radiation is not absorbed.

As can be seen, these characteristics demonstrate that the incidence of false alarms will be greatly reduced. Absorbing layer 20 absorbs broad-band visible and near-infrared radiation so that said radiation is reduced before it reaches the infrared (IR) sensor, acts as a protective over-coating to prevent damage to the mirror surface due to abrasions, oxidation, corrosion, or atmospheric contamination, and can be "tuned" by varying the thickness to selectively block specific wavelengths of IR and/or visible energy (to below 10% of incident radiation) which are determined to be most adverse to the performance of the infrared sensor. As indicated above, decreasing the coating thickness changes the absorption spectra of the coating towards shorter wavelengths. In essence, the coating is an optical "notch" filter, with excellent suppression of selectable wavelengths, while otherwise being a reasonably good reducer of broad-band visible and near-infrared (NIR) radiation.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of reducing the incidence of visible and near-infrared light impinging on a reflective surface of an optical reflector in a motion sensor, comprising:
   overlaying said reflective surface with a layer of non-crystalline carbon material;
   said layer of non-crystalline carbon material having a thickness ranging from approximately 600 angstroms to approximately 1000 angstroms;
   wherein said layer of non-crystalline carbon material absorbs visible and near-infrared light;
   wherein said reflective surface reflects mid-infrared light passing through said layer of non-crystalline carbon material for detection by an infrared detector; and
   wherein said layer of non-crystalline carbon material has an absorption spectra which is adjustable by adjusting said thickness.

2. A method as recited in claim 1, wherein said non-crystalline carbon material comprises amorphous diamond.

3. A method as recited in claim 1, wherein said non-crystalline carbon material comprises a diamond-like coating.

4. A method of reducing the incidence of visible and near-infrared light impinging on a reflective surface of an optical reflector, comprising:

coating said reflective surface with a diamond-like coating having a thickness ranging from approximately 600 angstroms to approximately 1000 angstroms;

wherein said diamond-like coating absorbs visible and near-infrared light;

wherein said reflective surface reflects mid-infrared light passing through said diamond-like coating for detection by an infrared detector;

and wherein said diamond-like coating has an absorption spectra which is adjustable by adjusting said thickness.

5. A method as recited in claim 4, wherein said diamond-like coating comprises a non-crystalline carbon material.

6. A method as recited in claim 4, wherein said diamond-like coating comprises an amorphous diamond material.

7. A mirror for a motion sensor having an infrared detector, comprising:

(a) a substrate base;

(b) a layer of reflective material adjacent to said substrate base; and (c) a light absorbing layer adjacent to said layer of reflective material;

(d) said light absorbing layer having a thickness ranging from approximately 600 angstroms to approximately 1000 angstroms;

(e) wherein said light absorbing layer absorbs visible and near-infrared light;

(f) wherein said layer of reflective material reflects mid-infrared light passing through said light absorbing layer for detection by said infrared detector; and (g) wherein said light absorbing layer has an absorption spectra which is adjustable by adjusting said thickness.

8. A mirror as recited in claim 7, wherein said light absorbing layer comprises a non-crystalline carbon material.

9. A mirror as recited in claim 7, wherein said light absorbing layer comprises an amorphous diamond material.

10. A mirror as recited in claim 7, wherein said light absorbing layer comprises a diamond like coating.

11. A mirror for a motion sensor having an infrared detector, comprising:

(a) a substrate base;

(b) a layer of reflective material adjacent to said substrate base; and (c) a diamond-like coating over said layer of reflective material;

(d) said layer of reflective material comprising chrome;

(e) said diamond-like coating having a thickness ranging from approximately 600 angstroms to approximately 1000 angstroms;

(f) wherein said layer of reflective material mid-infrared light passing through said diamond-like coating for detection by said infrared detector; and (g) wherein said diamond-like coating has an absorption spectra which is adjustable by adjusting said thickness.

12. A mirror as recited in claim 11, wherein said diamond-like coating comprises a non-crystalline carbon material.

13. A mirror as recited in claim 11, wherein said diamond-like coating comprises an amorphous diamond material.

14. A mirror for a motion sensor having an infrared detector, comprising:

(a) a substrate base;

(b) a layer of reflective material adjacent to said substrate base; and (c) a layer of non-crystalline carbon material adjacent to said layer of reflective material, wherein said layer of reflective material is between said substrate base and said layer of non-crystalline carbon material;

(d) said layer of reflective material comprising chrome having a thickness of approximately 1700 angstroms;

(e) said layer of non-crystalline carbon material having a thickness ranging from approximately 500 angstroms to approximately 1000 angstroms;

(e) wherein said layer of non-crystalline carbon material absorbs visible and near-infrared light;

(f) wherein said layer of reflective material reflects mid-infrared light passing through said layer of non-crystalline carbon material for detection by said infrared detector; and (g) wherein said layer of non-crystalline carbon material has an absorption spectra which is adjustable by adjusting said thickness.

15. A mirror as recited in claim 14, wherein said non-crystalline carbon material comprises a diamond-like coating.

16. A mirror as recited in claim 15, wherein said non-crystalline carbon material comprises an amorphous diamond material.

* * * * *